July 20, 1943.  E. C. DAMROW  2,324,615

PASTEURIZING APPARATUS

Filed Aug. 18, 1941  2 Sheets-Sheet 1

INVENTOR.
Edward C. Damrow
BY
Quarles & French
ATTORNEYS.

July 20, 1943.                E. C. DAMROW                2,324,615
                         PASTEURIZING APPARATUS
                    Filed Aug. 18, 1941        2 Sheets-Sheet 2
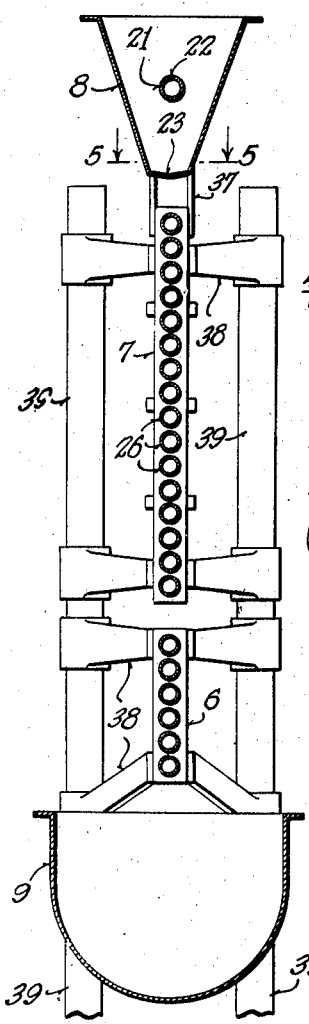
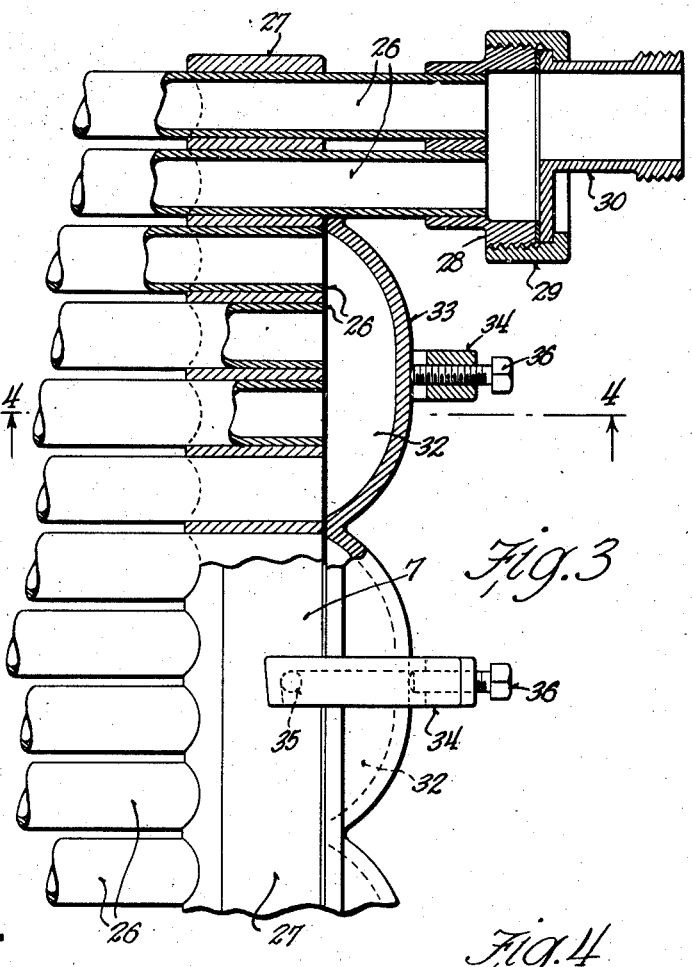
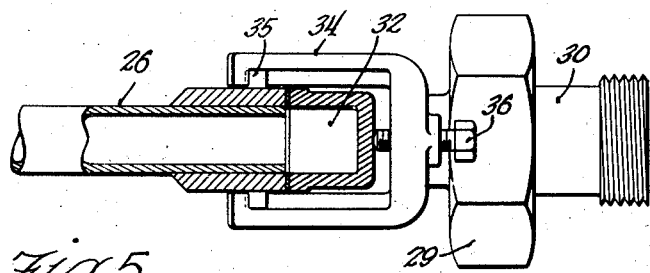
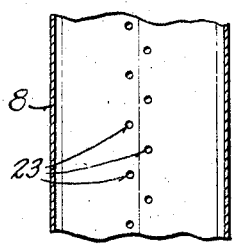
INVENTOR.
Edward C. Damrow
BY Charles & French
ATTORNEYS.

Patented July 20, 1943

2,324,615

UNITED STATES PATENT OFFICE 2,324,615

PASTEURIZING APPARATUS

Edward C. Damrow, Fond du Lac, Wis., assignor to Damrow Brothers Company, Fond du Lac, Wis., a corporation of Wisconsin Application August 18, 1941, Serial No. 407,335

1 Claim. (Cl. 257—11)

The invention relates to apparatus for pasteurizing liquid materials, more particularly milk.

The object of the invention is to provide a flash pasteurizing apparatus of simple, efficient, and compact construction and especially to improve the regenerator portion of such apparatus. Heretofore a single relatively large bore tubing has been used in the regenerator section of the apparatus, but this is open to objection as to efficiency and cost. To overcome these objections, I have provided a regenerator structure in which the tubing is of smaller diameter and comprises twice as many tube units, for example, of one inch diameter tubes as compared to the usual one and one-half or two inch diameter tubes.

The advantage of using the smaller tubes is that the milk which is usually pumped into the larger tube size distributes through the two smaller tube sizes at the same time. This reduces the friction head considerably in the capacities at which the units are operated, so that the milk will not leak past the headers and through the fittings in the pipe as would be the case if the same capacity were run through single smaller diameter tubes. The smaller tubes are also desirable because of the increase in heat transfer since there is a greater total surface exposed with the two smaller diameter tubes as compared to the one large diameter tube, and these smaller tubes also cost less to build even if it is double tubing than the larger tube sizes.

A further object of the invention is to provide a compact arrangement of parts of the apparatus whereby the heated pasteurized milk is immediately cooled after transferring a large percentage of its heat to another body of milk to be pasteurized.

The invention further consists in the several features hereinafter set forth and more particularly defined by the claim at the conclusion hereof.

In the drawings:

Fig. 2 is a detail sectional view taken on the line 2—2 of Fig. 1;

Fig. 3 is a detail view of the regenerator, parts being broken away and parts being shown in section;

Fig. 4 is a detail sectional view taken on the line 4—4 of Fig. 3;

Fig. 5 is a detail sectional view taken on the line 5—5 of Fig. 2, parts being broken away.

Figure 1:
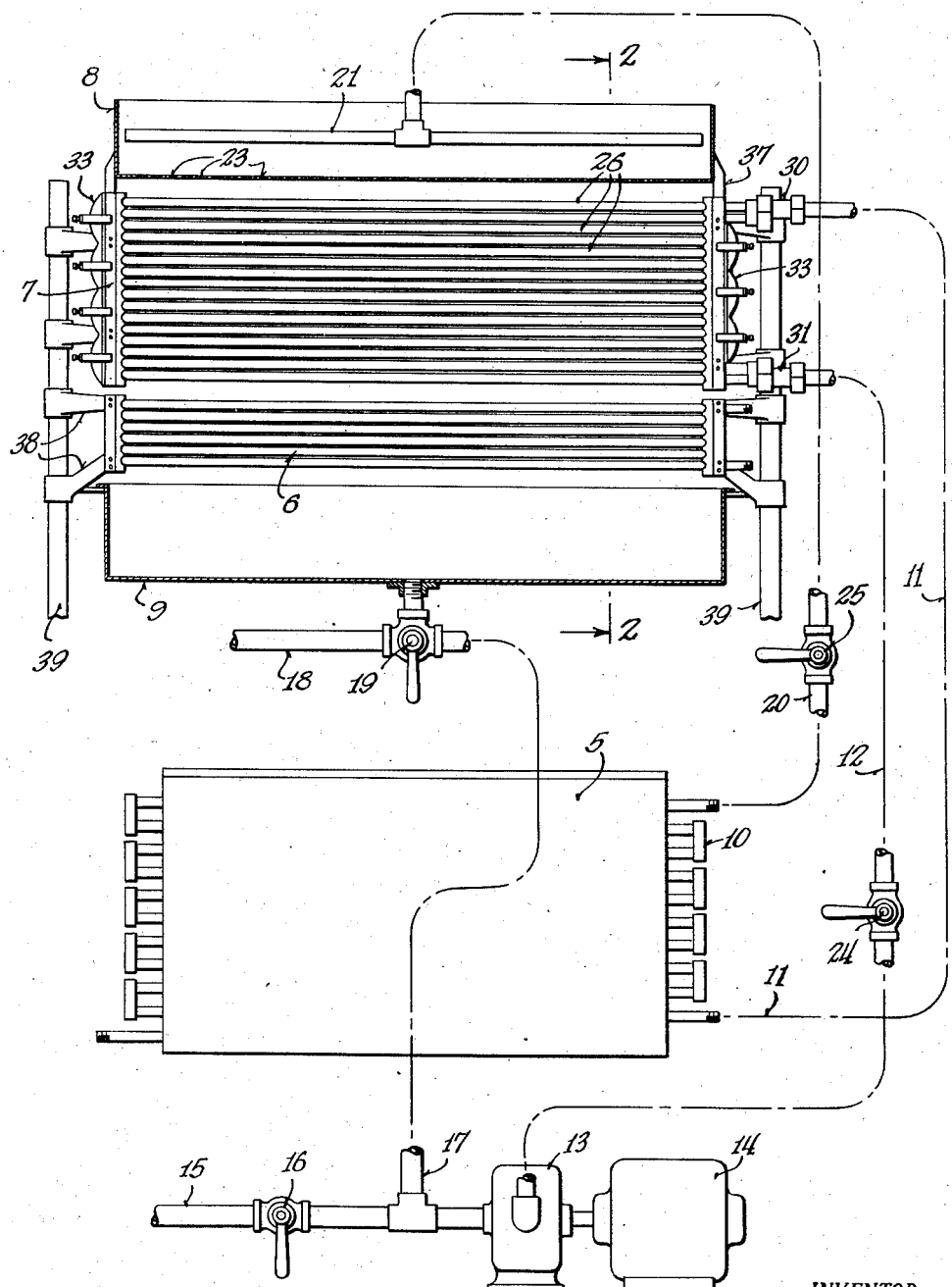
Fig. 1 is an elevation view of pasteurizing embodying the invention.

In the usual flash pasteurization apparatus the milk is heated to 160° to 165° Fahrenheit and held momentarily at that temperature and then cooled to 80° to 90° Fahrenheit for cheese making and lower for bottled milk. With a regenerator as a part of the apparatus the pasteurized milk is lead through the regenerator before being heated to the final pasteurizing temperature, and during its passage through said regenerator acquires a temperature of approximately 110° to 120° Fahrenheit. This pre-heated milk is then passed through the heater which brings it to its final higher pasteurizing temperature.

The apparatus includes a heater portion 5, a cooling part 6, and a regenerator portion 7. The cooling part 6, regenerator 7, a distributor trough 8, and a collecting trough 9 are arranged together as a unit which may be disposed above the heater 5.

The heater includes a milk receiving coil 10 whose inlet end is connected by piping 11 with the outlet from the regenerator 7, and the inlet of said regenerator is connected by piping 12 to the outlet of a pump 13 which is driven by an electric motor 14. The coil is heated by steam in the apparatus shown, but as any suitable heater may be used, further description is not deemed necessary.

The inlet to the pump 13 is connected to a supply pipe 15 controlled by a valve 16, and a recirculating pipe 17 connects this pipe between the valve 16 and the pump inlet with the discharge pipe 18 from the trough 9 which is controlled by a three way valve 19.

The outlet from the coil 10 connects by piping 20 to a distributor pipe 21 supported within and extending lengthwise of the trough 8 and provided with a plurality of holes 22 directing the hot milk upwardly in the trough which collects therein and flows by gravity from a series of discharge openings 23 in the bottom of said trough.

The pipes 12 and 20 are respectively provided with shut off valves 24 and 25.

The regenerator includes a coil formed of sections of parallel pipes 26 secured to headers 27, the pipes 26 being all vertically alined as shown in Fig. 2 and being arranged in pairs so as to form a double tube continuous coil in which the pipes 26 are of greater number and smaller diameter than those customarily used in apparatus of this general type. The upper two tubes have a coupling member 28 suitably brazed or soldered thereto which is connected by a coupling nut 29 with a coupling member 30 for the pipe 11. The lower two tubes are provided with a similar union coupling including a coupling member 31 for the pipe 12. Between these upper and lower sets of pipes pairs of pipes are connected at their ends to adjacent pairs of pipes by a passage 32 formed in a cap member 33 which is detachably secured at spaced intervals of the header 27 by clamping means comprising a series of clamps. Each of the clamps comprises a yoke member 34 whose legs are recessed to provide pockets at their ends for receiving pins 35 on the header, and the body of the yoke has set screws 36 mounted therein and adapted to engage the top of one of the sections of the cap member 33 so as to clamp the bottom face of said cap member tightly against the end face of the header 27.

Release of the clamps and removal of the caps 33 provides a straight through access for cleaning the tubes forming the regenerator, so that the cleaning may be easily and quickly accomplished.

The trough 8 is connected by brackets 37 to the headers 27, and these headers are connected by bracket arms 38 to supporting standards 39 to which the headers 40 for the cooling coil and the collecting trough 9 is also similarly connected, so that these parts are all arranged in vertical alinement, so that the heated milk delivered to the trough 8 will be discharged through the openings 23 downwardly over the pipes 26 and flow over these pipes and the pipes forming the cooling coil and then into the collecting trough 9 from which it may be discharged as pasteurized milk through the pipe 18 to the vat or other place of use or storage. Before its introduction to the trough 9 the milk in its passage through the coil 10 of the heater 5 has been heated up to a temperature of 160° to 165° Fahrenheit, and as it passes over the pipes 26 of the regenerator, it gives up some of its heat, and in doing so it heats the cold untreated milk in the regenerator to a temperature of 110° to 120° Fahrenheit, and then as it passes over the cooling coil 6, it has its temperature reduced to 80° to 90° Fahrenheit or lower depending upon the amount of cooling desired.

The raw milk is carried through the pipe 15 and forced through the regenerator and heater by the pump 13, but in order to start the process the first part of the milk is recirculated from the collecting trough 9 back to the inlet of the pump through the pipe 17, the valve 19 then being in a position to cut off the delivery pipe 18 and the valve 19 then closing off the supply pipe 15. After enough milk has been heated so as to provide for the heating of the untreated milk to the proper temperature by the regenerator, the valve 16 is opened to the supply pipe 15, and the valve 19 is opened to the delivery pipe 18, and thereafter the pump 13 passes all the milk from the storage tank through the pasteurizing apparatus to first heat and cool the milk as above described.

I desire it to be understood that this invention is not to be limited to any particular form or arrangement of parts except in so far as such limitations are included in the claim.

What I claim as my invention is:

In a pasteurizing apparatus of the character described, the combination with means for heating the liquid to be treated to a pasteurizing temperature, of a distributor trough for the heated liquid, a regenerator for the liquid to be pasteurized having a coil disposed below said trough in the path of heated liquid therefrom, a cooling coil below the coil of said regenerator over which the heated liquid flows, means including a pump for forcing milk through the coil of said regenerator, piping connecting the inlet of said pump with a source of milk supply, a collecting trough below said cooling coil to receive the pasteurized liquid, a discharge pipe leading from said collecting trough, a pipe connecting said trough with the inlet of said pump, and a valve to control flow of the cooled liquid either to said discharge pipe or said last named pipe.

EDWARD C. DAMROW.